United States Patent [19]
Hassett

[11] Patent Number: 5,351,187
[45] Date of Patent: Sep. 27, 1994

[54] AUTOMATIC DEBITING PARKING METER SYSTEM

[75] Inventor: John J. Hassett, Marblehead, Mass.

[73] Assignee: AT/COMM Incorporated, Marblehead, Mass.

[21] Appl. No.: 998,369

[22] Filed: Dec. 30, 1992

[51] Int. Cl.$^5$ .................. G06F 15/21; G07B 15/00; G08G 1/00
[52] U.S. Cl. .................. 364/401; 235/384; 340/928
[58] Field of Search .............. 235/382, 384, 380; 364/401, 467; 340/825.54, 988, 928, 991, 992, 932.2

[56] References Cited

U.S. PATENT DOCUMENTS

| | | | |
|---|---|---|---|
| 3,602,881 | 8/1971 | Bayne | 340/31 |
| 4,031,513 | 6/1977 | Simciak | 340/152 |
| 4,104,630 | 8/1978 | Chasek | 343/6.5 R |
| 4,303,904 | 12/1981 | Chasek | 340/23 |
| 4,310,890 | 1/1982 | Trehn et al. | 364/467 |
| 4,338,587 | 7/1982 | Chiappetti | 340/32 |
| 4,481,428 | 11/1984 | Charlot, Jr. | 307/219.1 |
| 4,501,958 | 2/1985 | Glize et al. | 235/384 |
| 4,555,618 | 11/1985 | Riskin | 235/384 |
| 4,786,903 | 11/1988 | Grindahl et al. | 340/825.54 |
| 4,847,776 | 7/1989 | Huang | 364/467 |
| 4,916,296 | 4/1990 | Streck | 235/454 |
| 4,937,581 | 6/1990 | Baldwin et al. | 342/44 |
| 5,086,389 | 2/1992 | Hassett | 364/401 |
| 5,266,947 | 11/1993 | Fujiwara | 340/932.2 |

FOREIGN PATENT DOCUMENTS

| | | |
|---|---|---|
| 58-222369 | 12/1983 | Japan . |
| 159526 | 7/1987 | Japan . |
| 63-288399 | 11/1988 | Japan . |
| 01259484 | 10/1989 | Japan . |

OTHER PUBLICATIONS

Desmond, "Toll Both Net Automates Fare Collection Saves Cash", Network World, vol. 6, No. 23, pp. 4–6.
Encyclopedia of Computer Science and Engineering, Van Norstrand Reinhold Company, Inc., 1983, pp. 563–565.

Primary Examiner—Roy N. Envall, Jr.
Assistant Examiner—Khai Tran
Attorney, Agent, or Firm—Lahive & Cockfield

[57] ABSTRACT

An apparatus for automatic payment of parking fees in a parking zone includes a stationary RF transmitter unit transmitting a signal encoding the parking fee rate per unit time and, in some embodiments, the maximum parking period and time and date to cooperate with a transponder carried in the vehicles to be parked. A portable transponder in each vehicle includes a receiver for receiving the broadcast signal from the stationary transmitter, a memory which can be preloaded with monetary amounts to generate a prepaid credit, a data processor for controlling the activity of the responder and decoding incoming signals, and a display for indicating to the vehicle operator or to a traffic monitoring person external to the vehicle, the status of the memory in the transponder as to the whether the vehicle is validly parked at any given time. Upon parking, the operator actuates the transponder and, if it receives and recognizes a broadcast signal from a stationary transmitter, it so indicates on the display, proceeds to debit the prepaid amount stored in the memory of the transponder decreasing the balance in the transponder memory by the amount per unit time over the time period and displaying an invalid parker indication when either the credit amount in the transponder memory is reduced to zero or the vehicle has remained in the parking zone beyond the maximum allowed time.

29 Claims, 3 Drawing Sheets

AUTOMATIC DEBITING PARKING METER SYSTEM

REFERENCE TO RELATED PATENTS

The subject matter of this application is related to that disclosed in U.S. Pat. No. 5,086,389 entitled Automatic Toll Processing Apparatus and is a Continuation-In-Part of copending U.S. Pat. application Ser. No. 945,523 entitled Electronic Parking and Dispatching Management Method and Apparatus which is itself a Continuation-In-Part of copending U.S. Pat. application Ser. No. 901,278, entitled Traffic Monitoring and Management Method and Apparatus, which is itself a continuation-in-part of U.S. Pat. No. 5,144,553, entitled Electronic Vehicle Toll Collection System and Method. The above cited patents and patent applications are assigned to the assignee of the present application, and are incorporated herein by reference.

BACKGROUND OF THE INVENTION

The present invention relates generally to apparatus for monitoring and collecting appropriate fees for parking in specific locations, such as designated parking zones in specific areas, such as sections of a city etc. More particularly, it relates to apparatus and method for utilizing a stationary radio transmitter to automatically collect fees for vehicle parking in a restricted area by communicating parking fee information to all vehicles carrying an actuated transponder within the area, and by collecting the required parking fees from those vehicles by means of debiting a prepaid monetary amount stored in a memory within the transponder.

In areas which provide for metered parking such as in designated parking zones on city streets, meters, requiring cash to be inserted, provide paid parking per unit time. In this situation the deposited cash is collected from the meters from time to time and parking monitors, or police, ticket vehicles parked beside meters where the paid for time has expired.

The metered parking system known in the art does, however, have drawbacks. For example, the vehicle operator must have cash in the correct denominations, and the cash stored in the meter must be collected from time to time. The meters themselves are sometimes subjected to abuse, entry of false coins and other treatment rendering them inoperative.

It is, therefore, an object of the present invention to provide an automatic parking payment system which debits prepaid amounts credited in a vehicle borne transponder, which responds to an area transmitter transmitting a cost per unit time signal.

It is another object of the present invention to provide for paid parking in designated zones on city streets without requiring cash deposits and transfers at the parking zone.

Other general and specific objects of the invention will in part be obvious and will in part appear hereinafter.

SUMMARY OF THE INVENTION

Broadly speaking, the present invention employs a portable transponder to be carried in a vehicle for cooperation with a specific area RF transmitter, broadcasting continuously a signal indicative of monetary parking fees as a function of time in that specific area. The transponder includes a receiver, a read/write memory component, a human interface including actuating devices and a display, and a data processor. In operation, the transponder is first brought to a station owned by the parking facility, or by a credit source and, in exchange for payment, an amount of money is credited in the transponder memory to cover expected parking fees for a suitable period of time. The transponder is then carried in the owner's vehicle. Upon entering a pay parking area such as a particular area of a city, and parking the vehicle in a parking zone, the transponder is activated by the vehicle operator. If the transponder receiver detects a broadcast RF signal indicating rate of payment, for example, 25¢ for 15 minutes, it transmits this signal to the data processor which commences debiting the monetary amount stored in memory at the specified rate. The transponder may include a clocking source so that over any given period of time the proper amount for the parking fee is debited.

The transponder includes a display element which displays an indication that the transponder is meeting its monetary obligations with respect to the broadcast signal, or conversely, that the transponder has run out of credit and is no longer able to debit its memory to pay the transmitted parking fee. In this latter case the display will indicate this status, as for example, "a no credit" or "invalid parker" display. The individual monitoring the parking area can then ticket that vehicle.

In another embodiment the individual monitoring the parking area may carry a scanning device which provides a signal interrogating the status of the transponder and, depending upon the received return signal, can again determine whether there is existing credit in the memory of the transponder.

Transponders constructed generally in a manner which will fulfill the needs of the present invention have been described in the previous patents and applications, referred to within this application and incorporated herein. Those transponders can be provided with suitable programming by conventional means in the data processor to perform the above functions.

The advantages of the system are apparent. Such a generalized broadcasting station and cooperating transponders can replace parking meters. The money for the parking fees is received in advance, at the time that the transponder memory is charged with a credit amount. There is, accordingly, no need to collect cash from meters in the parking zones. Similarly, the vehicle operator need not have cash of the right denominations. As will be apparent the same transponder may be employed in this application as is employed in the turnpike toll paying systems as described in U.S. Pat. No. 5,144,553 and the earlier referenced applications. Variations in the transponder contained program can be employed to provide other features, for example, a limited parking duration. In such an arrangement, the broadcasting station would broadcast identification of the specific area and the transponder would be enabled to debit its memory for only a preset amount before rendering the "no credit" output display. This could be reset by the operator returning to the vehicle and pushing a reset button or the like.

BRIEF DESCRIPTION OF THE DRAWINGS

For a fuller understanding of the nature and objects of the invention, reference should be made to the following detailed description and the accompanying drawings in which.

DESCRIPTION OF THE PREFERRED EMBODIMENTS

Figure 1:
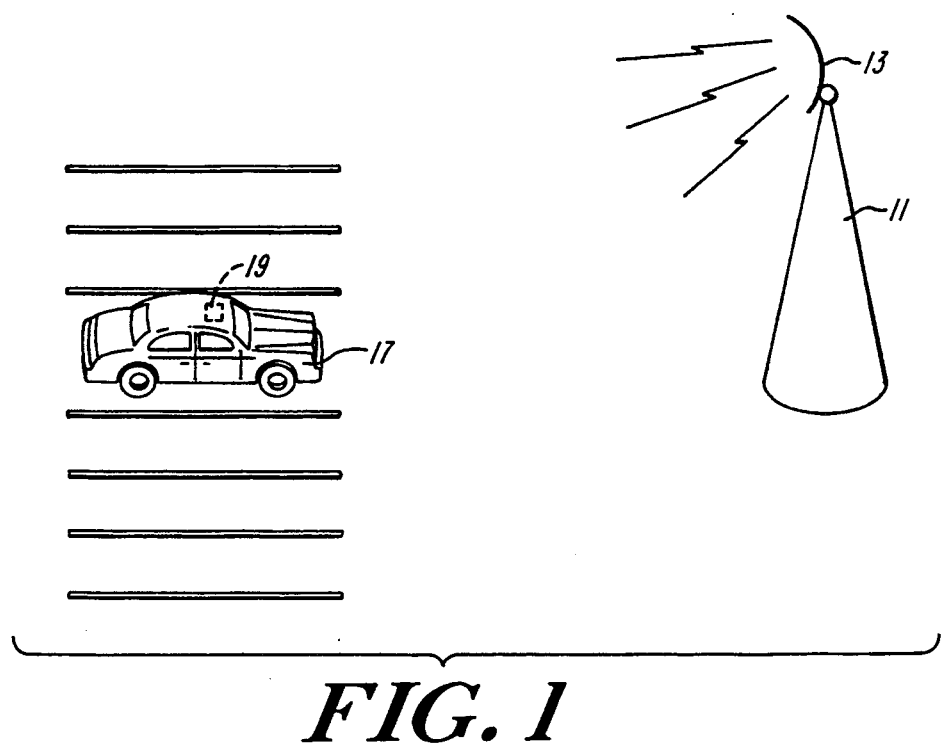
FIG. 1 is a schematic block diagram of a parking zone automatic payment system according to the invention.

With reference to FIG. 1, the transmitter station 11 continuously radiates an RF signal from antenna 12 covering a specific geographical area, for example, a section of city streets which have parking zones in them for paid parking. The broadcast signal includes, at least, information as to payment rate for parking, for example, 0.25 for 15 minutes. In most cases it would also include identification of the specific area and perhaps the date and time of day. A vehicle 17 parking in a parking zone within the area carries a portable transponder 19. When the vehicle is positioned in an appropriate parking zone, the operator activates the transponder by pushing a button or the like. The transponder includes a receiver, which upon receiving the RF signal from the stationary transmitter 11, provides an output indication to the operator through a display in the transponder. The display also, typically, provides an indication of the monetary parking rate in that area.

The transponder may be arranged so that, once actuated, it initiates the action of debiting an internally stored credit amount by the transmitted monetary parking fee rate. Alternatively, the system may be arranged to require a second activation to start this process. For the period that the vehicle 17 remains in the parking zone, the debiting action continues until either the operator returns and stops the action of the transponder, or the transponder credit balance goes to zero. In the latter case, the display indicates that the balance is used up, or the transponder may include a circuit which can be scanned externally by a person serving as a parking monitor who can scan with an interrogator to determine the status of the account balance. In the case that the vehicle is still in the parking zone and is out of funds, a parking ticket can be issued. Similarly, if the area has a maximum time limitation, for example, two hours, at the expiration of the two-hour period of actuation, the transponder is programmed to stop the debiting action and to provide an output signal on the display or to an interrogator at that the vehicle is no longer validly parked.

While the embodiment illustrated in FIG. 1 uses an RF radiated signal, it will be appreciated that other types of irradiated signals such as infra-red, microwave etc. can be employed.

Such transponders are known in the art. A specific transponder suitable for this purpose is described with reference to FIG. 4. herein. It will be understood that the transponder can obtain prepaid credit by going to an appropriate station operated by the parking authority or by another suitable credit authority and upon payment of cash the transponder can have its memory loaded with a signal indicating a corresponding monetary amount. Alternatively, a so-called smart card carrying a microchip may interface with other circuit components to transfer data or instructions to or from the vehicle transponder 19.

Figure 2:
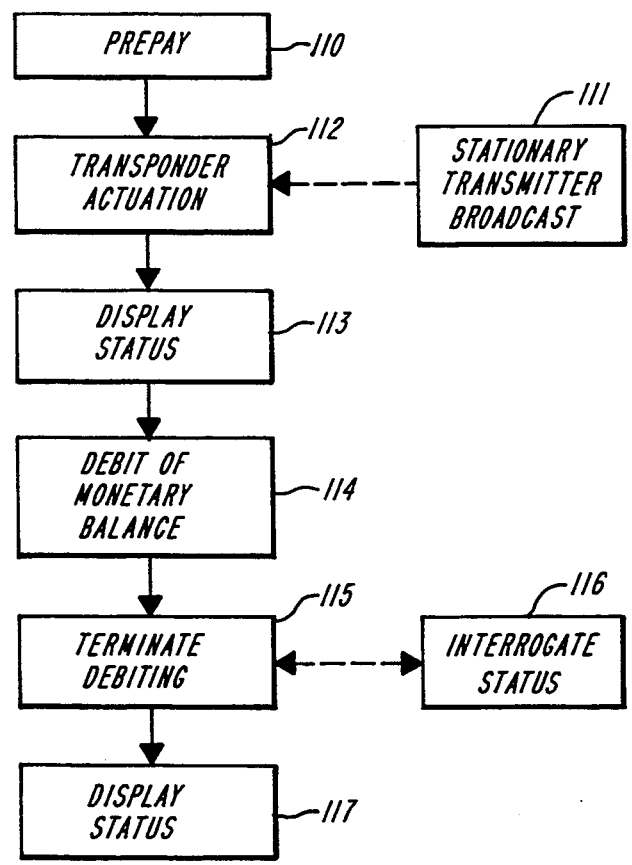
FIG. 2 shows a flow diagram depicting the operation of the system of FIG. 1.

FIG. 2 is a flow diagram of the operations of the automatic paid parking system of this invention. As illustrated, the initial operation, 110 is one where the prepayment information is loaded into the transponder 19. This is accomplished by taking the transponder to an appropriate station of the appropriate parking authority, or other designated credit organization, and making a cash payment, in exchange for which the equivalent amount is loaded into the memory 28 of the transponder through port 40. As illustrated at block 111, the stationary transmitter 11 is continuously generating an output signal indicative of the parking fee rate within its covered area, and may also include information as to the time and date and to the maximum allowed period of parking. In step 112, the vehicle carrying the transponder 19 is parked in the parking zone within the specific area covered by signal broadcast from a stationary transmitter 11. In this same step 112, the transponder 19 in the vehicle 17 is activated by its operator, for example, by operating a switch or push button. If the transponder receiver 36 detects an appropriately coded RF signal, it provides, as indicated in step 113, in a display readable by the operator, such as in an LCD display, information that the radio field is being broadcast, the parking rate for that specific zone, and the balance of the monetary amount in the transponder memory.

The transponder is programmed to commence a debiting operation through its data processor and memory to debit the broadcast fee rate as a function of time against the monetary balance carried in its memory. This may be initiated automatically as indicated in step 114, or this activity may require a second manually entered activation by the operator.

This activity by the transponder terminates in step 115 on the occasion of any one of three events. The first is that the operator returning to his vehicle deactivates the switch on the transponder, the second is that the debiting action reduces the monetary balance in the transponder memory to zero, and the third is that the maximum allowable time period expires. This latter event may be determined, either by a timer within the transponder, or by a maximum amount corresponding to the maximum time period for the product of the maximum time period times the parking fee rate, having been debited. In the latter two instances, the transponder still being in an actuated state, has the status of an invalid parker.

After the termination of the debiting action, if the transponder remains actuated, the invalid parker status is made available to a monitoring person outside the vehicle, as indicated in step 116 by transmitting an invalid parking status signal in response to an interrogation signal actuated by the monitoring person, or, as indicated in step 117 by providing a visual display of this invalid parker status.

Figure 3:
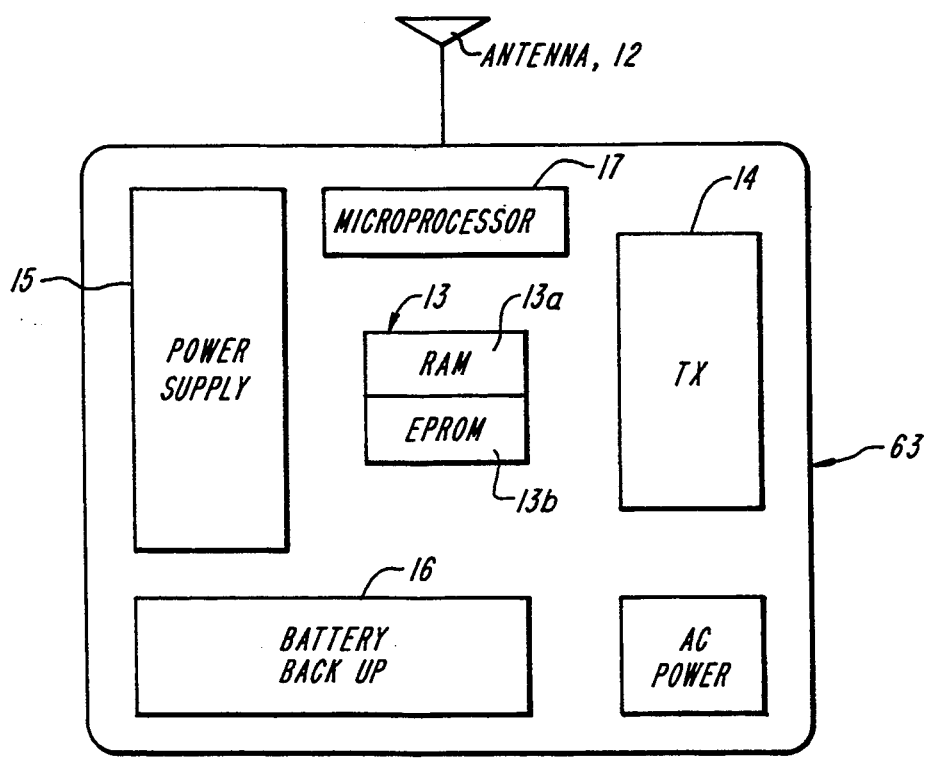
FIG. 3 is a simplified block diagram of a stationary transmitter unit of the type depicted in FIG. 1 and constructed in accordance with the invention.

FIG. 3 shows a block diagram of a stationary transmitter unit 11 of the type depicted in FIG. 1 and constructed in accordance with the invention. Those skilled in the art will appreciate that while the illustrated transmitter utilizes radio frequency signal generating elements, the invention can also be practiced in connection with transmitter components utilizing infrared (IR) or other radiant electromagnetic energy wavelengths.

As discussed above, the stationary transmitter repeatedly emits an encoded signal that provides the vehicle transponders with information regarding the monetary rate per unit time for parking, the maximum period for parking, if applicable, and, perhaps, a date time signal and parking area identification. The format of the particular communications is discussed below.

Each of the illustrated stationary transmitters units 11 may include a conventional transmitter 14; an antenna element 12; a memory element 13, including a random access memory (RAM) 13a, or an electrically programmable read only memory (EPROM) 13b; a power supply element 15; a back-up battery 16; a microprocessor element 17; and an AC power supply element 18. These components are conventional in design and materials, and the transmitter elements can be constructed in accordance with known engineering practices. The complete transmitter assembly is preferably enclosed in a rugged weatherproof housing, to withstand the ranges of temperature, humidity, and ultraviolet radiation typical of the outdoor environment.

Figure 4:
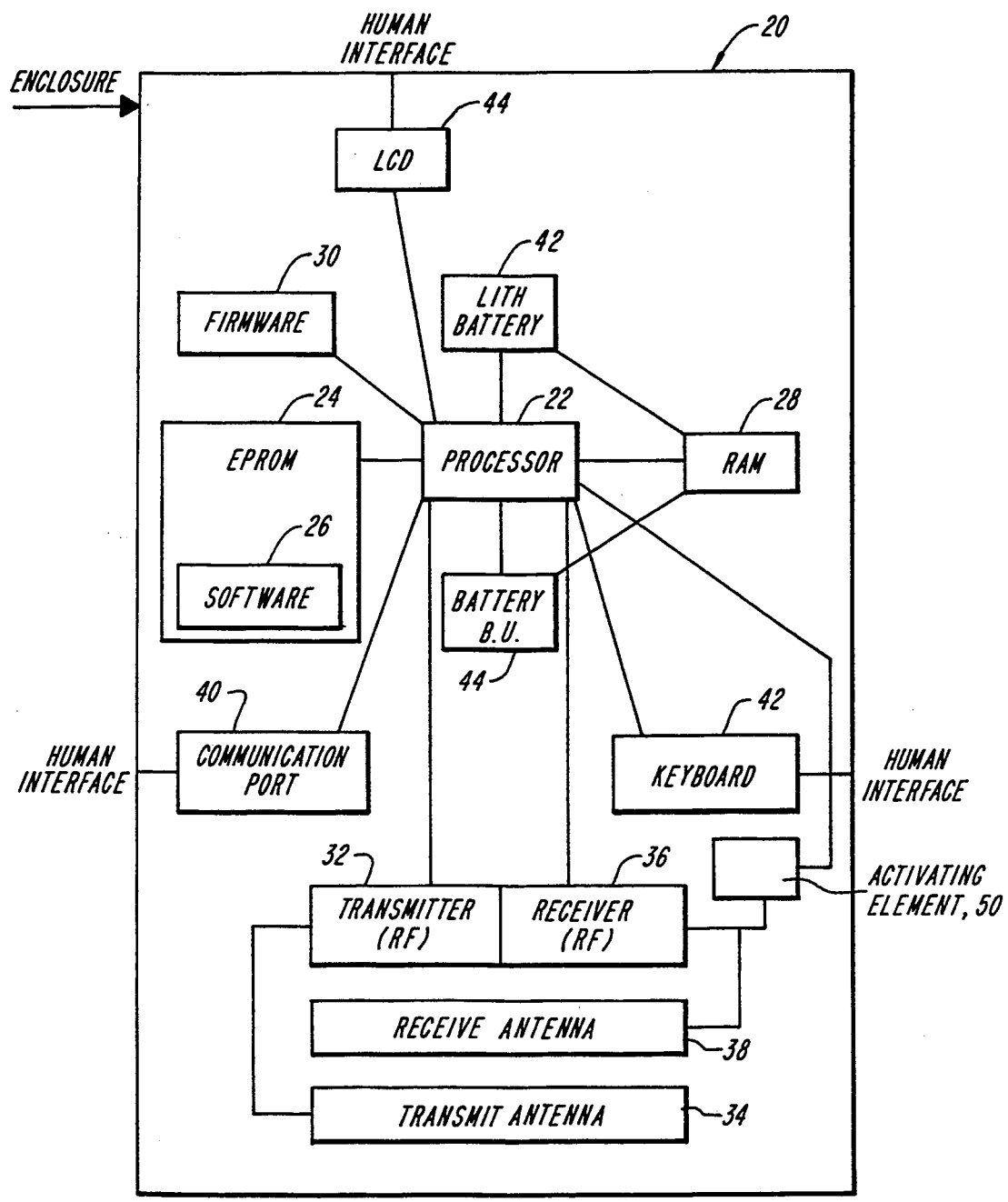
FIG. 4 is a schematic block diagram of a vehicle transponder unit, particularly adapted for operation in the system of FIG. 1.

FIG. 4 is a schematic block diagram of a vehicle transponder 20, particularly adapted for operation in the systems depicted in FIGS. 1 and 2. The vehicle transponder 20 includes a processor element 22, an associated EPROM 24 for storing control software 26, a CMOS RAM memory element 28 for storing information collected from a transmitter unit of the type depicted in FIGS. 1 and 3, as well as credit information representing prepaid monetary amounts, control firmware 30, an RF transmitter 32, and associated antenna module 34, an RF receiver 36 and an associated antenna 38, human interface elements 42 and 44, a bi-directional communications port 40 and a vehicle transponder actuating element 50 for signaling the vehicle transponder that a parking period is beginning or ending and placing the transponder in a state to determine if it is receiving an appropriate broadcast signal.

The processor element 22 can be an 8086 or other microprocessor capable of executing the calculations necessary to process the collected information. The microprocessor 22 also controls decoding an interpretation of encoded communication signals received from a stationary transmitter 11. The RAM element 28 preferably provides sufficient storage to store the information collected from the stationary transmitters of the type depicted in FIGS. 1 and 3.

The vehicle transponder antennas 34 and 38 can be incorporated into the vehicle transponder.

The human interface elements preferably include user operable keyboard 42, and LCD or LED display units 44. The display elements provide visual information, such as the monetary amount of credit stored in memory element 28, the parking time allowed for parking in a zone, and a signal indicating either zero balance, or that the vehicle has been parked longer than the allowed maximum time. The display 44 and user interface keyboard 42 in combination with conventional EPROM-stored software routines 26 for controlling the microprocessor 22, enable the vehicle operator to view information collected by the vehicle transponder and also to enter other information, such as the allowed length of stay in the parking zone. According to one embodiment, the user interface includes an alphanumeric display having two lines of ten characters each.

The bidirectional communication port 40 enables other microprocessors to write data into and read data out of the vehicle transponder RAM 28. It is through this port that a prepaid monetary balance can be entered.

The power supply elements preferably include a compact, user-replaceable long-life battery 42, such as a lithium power cell. The power supply also includes a battery backup 44 so that the RAM 28 is not cleared during replacement of the lithium cell 42.

The vehicle transponder components, depicted in FIG. 4, are conventional in design and construction, and the vehicle transponder can be constructed in accordance with known transponder and microprocessor control principles. The illustrated vehicle transponder/processor 20 can be housed in a compact, portable enclosure adapted for removable attachment to a dashboard surface or other convenient location within the vehicle.

As previously mentioned, the vehicle transponder receiver 36 decodes, and stores signals transmitted from the stationary transmitter. The vehicle transponder processor 20 interprets the received signals and, in response, either collects data specified by the signals, or signals the vehicle operator, via the human interface, to take a specified action.

Information packets transmitted and received by the vehicle transponder processor 20 can be flexibly configured with or without a fixed length. Additionally, the packets can incorporate an encrypted synchronization portion, a transaction portion, and a check sum portion. According to the invention, the communication format can be modified to suit particular applications.

According to one preferred embodiment, information packets are transmitted in the form:

| SYNC/TT/DATA/CK SUM |
| --- |

SYNC denotes an encrypted synchronization field to indicate that a message is about to begin and that message is from a device which is allowed access to the vehicle transponder. TT is a binary code identifying the type of data field included in the packet. DATA is a substantive portion of the information packet, requests for transmission, messages to be displayed to the vehicle operator, or requests to collect certain types of data. CK SUM represents error detection codes used to ensure transmission fidelity.

Examples of DATA filed include:

| DTS |
| --- |
| IDENTIFICATION OF PARKING AREA COVERED |
| MONETARY PARKING RATE |
| MAXIMUM ALLOWABLE PARKING PERIOD |

DTS is a current date and time stamp. It can be included in either a transmission from a stationary transmitter to a vehicle transponder or from a vehicle transponder to an external interrogator. IDENTIFICATION is a code, transmitted from a stationary transmitter, and indicative of the particular parking area covered. MESSAGE is a data field, transmitted from a stationary transmitter, containing a message for the vehicle transponder, such as monetary fee per unit time for parking or maximum allowed time for parking in the covered area. The vehicle transponder may alert the operator as to the message by activating the visual user interface.

While the above discussion describes the invention in terms of an illustrative hardware embodiment, those skilled in the art will appreciate that a method of automatically monitoring vehicle parking according to the invention, can be operative with a plurality of alternate hardware embodiments.

It will thus be seen that the invention efficiently attains the objects set forth above, among those made apparent from the preceding discussion. In particular, the invention provides method and apparatus for providing an automated system for collecting vehicle parking fees in a parking zone.

It will be understood that changes may be made in the above construction and in the foregoing sequences of operation without departing from the scope of the invention. The illustrated radio frequency transmitters, for example, may be replaced by infrared transmitters or emitters operating in other regions of the electromagnetic spectrum.

It is accordingly intended that all matter contained in the above description or shown in the accompanying drawings be interpreted as illustrative rather than in a limiting sense.

Having described the invention, what is claimed as new and secured by the Letters Patent is:

1. Apparatus for automatically debiting vehicular parking fees in a specified area comprising,
   a stationary transmitter broadcasting a signal over said specified area including zones for pay parking, wherein said broadcast signal includes information indicating a monetary fee per unit time for parking in said zones, and
   a portable transponder to be carried by a vehicle, said transponder including,
   a) a receiver for receiving said broadcast signal,
   b) a read/write memory for storing information indicative of a monetary amount,
   c) means for providing information external to said transponder of said monetary amount in said memory at a given time, and
   d) a data processor coupled to both said read/write memory and said receiver, said data processor responding to said broadcast signal being sensed by said receiver by decreasing said monetary amount in said memory by said monetary fee per unit time for the time duration of parking, said memory providing a specific output signal indicative of the status of said monetary amount in said memory, or said parking status being invalid, said data processor providing for entering into said memory a signal indicative of a specified monetary value in response to an externally applied signal.

2. Apparatus in accordance with claim 1 wherein said broadcast signal information indicates current date and time and said data processor decreases the monetary amount in said memory as a function of time.

3. Apparatus in accordance with claim 1 wherein said broadcast signal is in an RF range.

4. An apparatus in accordance with claim 1 wherein said means for providing information external to said transponder of said monetary amount in said memory comprises a display unit readable external to said vehicle.

5. Apparatus in accordance with claim 1 wherein said means for providing information external to said transponder includes a transmitter for transmitting information outside of said vehicle of the parking status or monetary amount in said memory.

6. Apparatus in accordance with claim 1 wherein said means for providing information external to said transponder of the monetary amount in said memory comprises means for interrogating said memory in response to a specific externally applied interrogation signal and transmitting said signal indicative of the monetary amount in said memory in response to reception of said externally applied interrogating signal.

7. Apparatus in accordance with claim 2 including means actuable by the vehicle operator to activate a program in the transponder for receiving the transmitted signal, decoding the transmitted signal and changing the information stored in said transponder memory as a function of time to debit a monetary amount in the memory at a rate controlled by said information indicating a monetary fee per unit time transmitted by the area station.

8. Apparatus in accordance with claim 1 in which said read/write memory includes means for storing a parking credits signal representative of a monetary quantity available for paying any fees associated with remaining in said paid parking area.

9. Apparatus in accordance with claim 2 in which said transponder data processor includes means for tracking an elapsed time that said vehicle is within said pay parking zone, said time being in relation to said current date and time received from said stationary transmitter.

10. Apparatus in accordance with claim 9 in which said transponder data processor includes means for calculating a fee based on said broadcast fee per unit time and said elapsed time, and for periodically debiting said parking credits signal to reflect said fee.

11. Apparatus in accordance with claim 10 in which said transponder data processor includes means for storing in said read/write memory a running total of said fee charged, and said transponder includes display means for displaying to a vehicle operator at least a present quantity of balance of monetary amount of said running total.

12. Apparatus in accordance with claim 6 wherein the data processor stops the debiting operation and, when the means actuable by the vehicle operator has been actuated for a predetermined time period, corresponding to a maximum allowed parking period in the covered area provides an output signal indicative of this condition.

13. A method for automatically debiting vehicular parking fees in a specified area comprising the steps of;
   (a) entering into a memory a signal indicative of a specified monetary amount in response to an externally applied signal,
   (b) broadcasting a signal from a stationary transmitter over said specified area including zones for pay parking, wherein said broadcast signal includes information indicating a monetary fee for parking in said zones,
   (c) receiving said broadcast signal in a receiver in a portable transponder carried by a vehicle,
   (d) storing information indicative of a monetary amount, in said read/write memory in said transponder,
   (e) providing information external to said transponder of said monetary amount in said memory at a given time, and
   (f) responding to said broadcast signal being sensed by said receiver by decreasing said monetary amount in said memory by said monetary fee for parking, and (g) providing a specific output signal indicative of the status of said monetary amount in said memory, or said parking status being invalid.

14. A method in accordance with claim 13 wherein said broadcast signal information indicates current date and time and the monetary fee per unit time and the monetary amount in said memory is decreased as a function of time.

15. A method in accordance with claim 13 wherein said broadcast signal is in an RF range.

16. A method in accordance with claim 13 wherein said specific output signal indicative of the status of said monetary amount in said memory is readable external to said vehicle.

17. Apparatus in accordance with claim 13 wherein said specific output signal is transmitted outside said vehicle from a transmitter within said vehicle.

18. A method in accordance with claim 13 wherein said steps of providing, external to said transponder, information of the monetary amount in said memory is done by interrogating said memory in response to a specific interrogation signal applied external to said vehicle and transmitting outside of said vehicle said signal indicative of the monetary amount in said memory in response to reception of said externally applied interrogating signal.

19. A method in accordance with claim 14 wherein a program in said transponder is activated for receiving the transmitted signal, decoding the transmitted signal and changing the information stored in said transponder memory as a function of time to debit a monetary amount in the memory at a rate controlled by said monetary parking rate transmitted by said stationary transmitter.

20. A method in accordance with claim 19 wherein the debiting operation is stopped, an output signal is provided indicative of this condition when the apparatus of said program has been activated for a predetermined time period, corresponding to a maximum allowed parking period in the covered area.

21. A method in accordance with claim 14 in which an elapsed time that said vehicle is within said pay parking zone is tracked, said time being in relation to said current date and time received from said stationary transmitter.

22. A method in accordance with claim 21 which includes the step of calculating a fee based on said broadcast fee per unit time and said elapsed time, and periodically debiting said parking credits signal to reflect said fee.

23. A method in accordance with claim 22 including the further step of storing in said read/write memory a running total of said fee charged, and displaying in said portable transponder to a vehicle operator at least a present quantity of balance of monetary amount of said running total.

24. Apparatus for automatically debiting parking fees for vehicles in a specified area comprising,
a stationary transmitter broadcasting an RF signal over said specified area including zones for pay parking, wherein said broadcast signal includes information indicating a monetary fee per unit time for parking in said zones, and a signal indicating current date and time, and
a portable transponder located within said vehicle, said transponder including,
a) a receiver for receiving said broadcast RF signal,
b) a read/write memory for storing information indicative of a monetary amount,
c) means included within said transponder for providing information external to said transponder of said monetary amount in said memory at a given time, and
d) a clocking source;
e) a data processor coupled to said read/write memory, said clocking source and said receiver, said data processor being activated to respond to said RF broadcast signal being sensed by said receiver by decreasing said monetary amount in said memory by said monetary fee per unit time for parking in accordance with a time derived from said clocking source, said memory providing a specific output signal indicative of the status of said monetary amount in said memory, or said parking status being invalid, said data processor providing for entering into said memory a signal indicative of a specified monetary value in response to an externally applied signal.

25. Apparatus in accordance with claim 24 wherein said means for providing information external to said transponder of said monetary amount in said memory comprises a display unit readable external to said vehicle.

26. Apparatus in accordance with claim 24 wherein said means for providing information external to said transponder includes a transmitter for transmitting information of the parking status or monetary amount in said memory outside of said vehicle in response to an interrogating signal.

27. Apparatus in accordance with claim 24 wherein said means for providing information external to said transponder of the monetary amount in said memory comprises means for interrogating said memory in response to a specific externally applied interrogation signal and transmitting said signal indicative of the monetary amount in said memory in response to reception of said externally applied interrogating signal.

28. Apparatus in accordance with claim 24 wherein the data processor stops the debiting operation and provides an output signal indicative of this condition when the means actuable by the vehicle operator device has been actuated for a predetermined time period, corresponding to a maximum allowed parking period in the covered area.

29. Apparatus in accordance with claim 28 in which said transponder data processor includes means for tracking an elapsed time that said vehicle is within said pay parking zone, said time being in relation to said current data and time received from said stationary transmitter.

* * * * *